United States Patent
DeLand et al.

[11] Patent Number: 5,941,267
[45] Date of Patent: Aug. 24, 1999

[54] ELECTRICALLY CONTROLLED FLOW REGULATOR VALVE WITH TRANSIENT DAMPENING

[75] Inventors: Daniel L. DeLand, Davison; Barbara J. Erickson, Holly, both of Mich.

[73] Assignee: Eaton Corporation, Cleveland, Ohio

[21] Appl. No.: 09/057,891

[22] Filed: Apr. 9, 1998

[51] Int. Cl.[6] .................................................. G05D 7/06
[52] U.S. Cl. .............................. 137/15; 137/501; 251/52; 251/53
[58] Field of Search ........................... 137/15, 315, 501; 251/52, 53

[56] References Cited

U.S. PATENT DOCUMENTS

| 1,640,842 | 8/1927 | Loomis | 137/501 |
|---|---|---|---|
| 2,881,794 | 4/1959 | Baldwin et al. | 137/501 |
| 3,357,448 | 12/1967 | Martin | 137/501 |
| 4,250,914 | 2/1981 | Ferrentino | 137/501 |
| 4,462,566 | 7/1984 | French | 137/501 X |
| 4,691,619 | 9/1987 | Kervagoret | 137/501 X |

FOREIGN PATENT DOCUMENTS 1272656 11/1966 Germany .................................. 251/53

*Primary Examiner*—Stephen M. Hepperle
*Attorney, Agent, or Firm*—Roger A. Johnston

[57] ABSTRACT

An electrically controlled flow regulator valve assembly having a diaphragm operated pressure regulator valve with a solenoid operated valve for by-passing the diaphragm to control flow to the regulator valving chamber. In one embodiment the regulator valving chamber communicates through a small restricting orifice with a closed dampening chamber. In another embodiment a second closed dampening chamber is formed to communicate through a second small restrictive orifice with a chamber on the inlet pressure side of the diaphragm.

11 Claims, 2 Drawing Sheets

ELECTRICALLY CONTROLLED FLOW REGULATOR VALVE WITH TRANSIENT DAMPENING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to flow regulators and particularly flow regulators employed for compressible fluid flow control and more particularly relates to such regulators which are supplied with a fluid pressure signal which is modulated by an electrically remote controlled valve for controlling the pressure applied to one side of a pressure responsive member. Regulators of this type typically have a moveable valve member attached to the opposite side of the pressure responsive member for controlling flow over a valve seat of the compressible fluid to be flow regulated.

Regulators of this type are utilized in motor vehicle fuel vapor emission control systems for controlling flow from a fuel vapor purge canister for communication with the charge air inlet of the vehicle engine. Purge control regulators of this type are known to utilize the engine manifold depression or vacuum as a fluid pressure signal source for the regulator. An example of such a regulator is that shown and described in U.S. Pat. No. 5,429,099 issued to Daniel L. DeLand.

In such known fuel vapor purge system flow regulators, problems have been experienced at certain levels of pressure in the vapor canister and at certain flow conditions in a connecting conduit between the canister and the flow regulator valve inlet. For a given length of conduit, pulses and rarefactions in the flow conduit have produced a standing wave which causes vibration of the pressure responsive member which in turn has produced a resonance in the conduit with the resultant tuning of the conduit. This resonating of the conduit between the fuel vapor canister and the regulator valve has produced an audible phenomenon known as "hooting" which is an undesirable noise in the system from the vehicle occupants' standpoint. A purge control regulator which addresses the hooting problem, is shown and described in a copending application Ser. No. 08/853,015, filed May 8, 1997 in the names of Barbara J. Erickson, Gerrit V. Beneker, Charles A. Detweiler and Daniel L. DeLand entitled "Dampening Resonance In A Flow Regulator" and assigned to the assignee of the present application. Another example of a fuel vapor purge regulator of the aforesaid type which addresses the "hoot" problem is that shown and described in a co-pending application Ser. No. 08/808,557, filed Feb. 28, 1997 in the name of Daniel L. DeLand, et al., entitled "Dampening Resonance In a Flow Regulator" and assigned to the assignee of the present invention.

Fuel vapor purge control regulators have also been designed to provide an electrically controlled valve for controlling fuel vapor by-pass flow around the pressure responsive member and eliminate atmospheric bleed flow to an intake manifold vacuum signal. An example of the latter type fuel vapor purge control regulator is shown and described in co-pending application Ser. No. 08/949,106, filed Oct. 10, 1997 entitled "Fuel Vapor Purge Control" in the name of Daniel L. DeLand, et al and assigned to the assignee of the present invention.

The latter type fuel vapor purge control regulator does not use a control signal based upon atmospheric bleed to intake manifold vacuum line and does not apply manifold vacuum directly to the control pressure side of the diaphragm. However, because the outlet of the regulator valve discharges to the engine intake manifold the regulator is subject to pulsations in manifold vacuum entering the regulator and causing resonant vibration and "hooting" in the system.

Thus, it has been desired to provide a way or means of dampening pressure pulsations or rarefactions in a flow regulator and to provide such dampening in a way that is low in manufacturing costs and does not adversely affect the function or calibration of the flow regulator.

BRIEF SUMMARY OF THE INVENTION

It is an object of the present invention to provide a way of dampening pressure pulses and rarefactions in the inlet of a flow regulator of the type employing a pressure responsive member moveable in response to differential pressure thereacross for controlling movement of a flow regulating valve member.

It is a further object of the present invention to provide a way of dampening pressure pulsations in a flow regulator having a pressure responsive member moveable in response to differential pressure thereacross for moving a flow regulating valve member with the pressure differential controlled by a remotely actuated electrically operated valve for controlling by-pass flow around the pressure responsive member to maintain flow to a chamber on one side of the pressure responsive diaphragm which moves the pressure regulator valve.

The present invention provides a pressure regulator valve housing having the diaphragm therein dividing the housing into an outlet chamber and an inlet chamber. The housing is formed preferably integrally as one piece with the body of an electrically controlled by-pass flow valve which has its inlet connected to the inlet pressure chamber and the outlet discharging to the outlet pressure chamber on the opposite side of the diaphragm.

In one embodiment, the outlet pressure chamber is closed by a closure member which defines a vent port and a fitting adapted for connection to a fuel vapor purge line to the engine intake manifold. The closure member has a bleed orifice formed therein and a second member is received thereover and attached to the housing and the closure member to form a dampening chamber which communicates with the outlet pressure chamber only through the bleed orifice.

In another embodiment, an auxiliary wall or partitioning member is disposed in the inlet chamber and forms a second dampening chamber on the inlet chamber side of the diaphragm opposite the outlet pressure chamber.

The dampening chambers serve to attenuate pulsations in the inlet and outlet chambers to minimize the occurrence of "hooting".

DETAILED DESCRIPTION OF THE INVENTION

Figure 1:
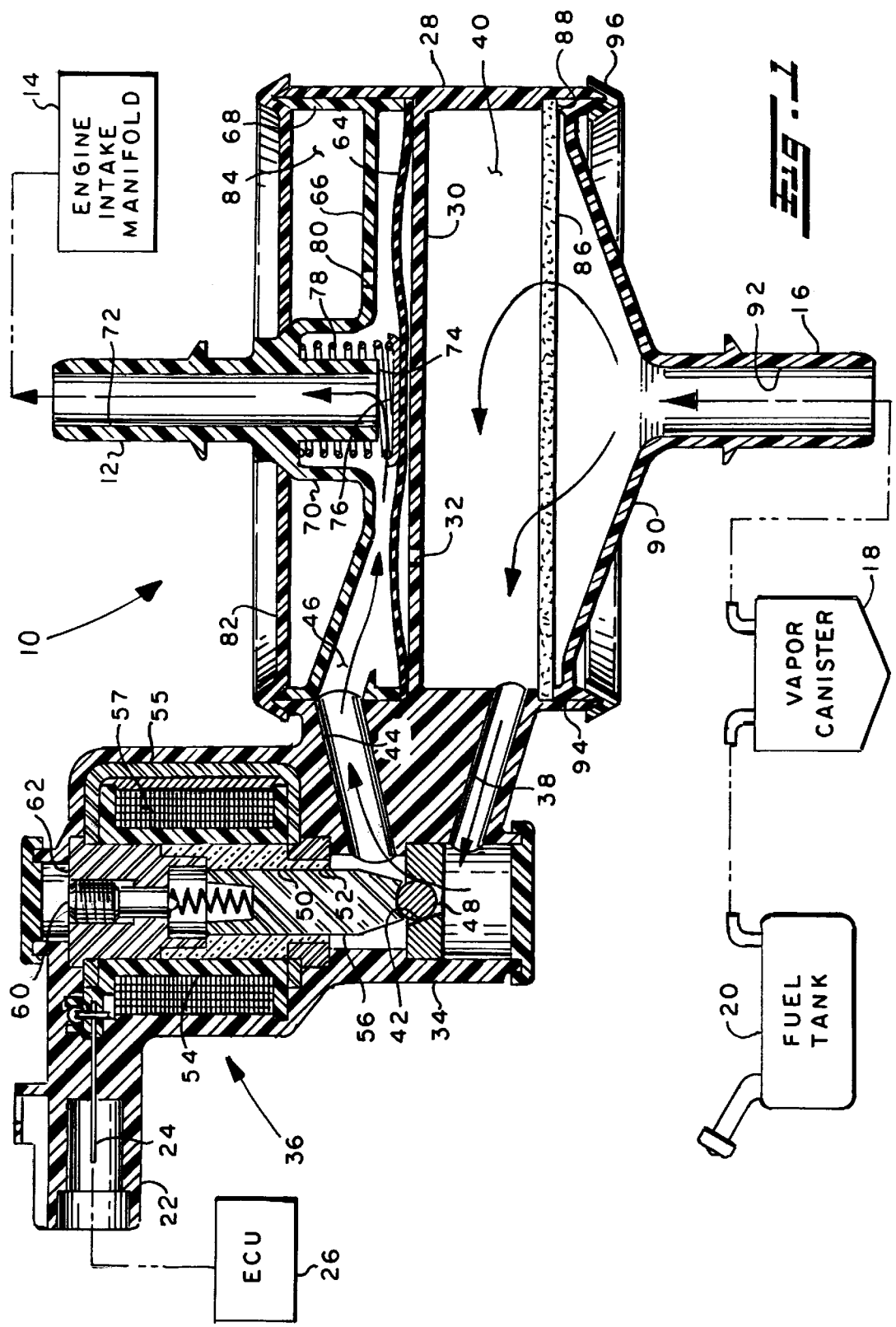
FIG. 1 is a cross-section of the electrically controlled flow regulator of the present invention and shows the connections to various components of a fuel vapor purge system by dashed outline; and, FIG. 2 is a view similar to FIG. 1 showing an alternate embodiment of the electrically operated purge flow regulator of the present invention so applied to a system such as in FIG. 1.

Referring to FIG. 1, the electrically operated flow regulator of the present invention is indicated generally at 10 and has an outlet fitting 12 adapted for connection to an engine intake manifold indicated at 14. Regulator 10 also has an inlet fitting 16 adapted for connection to a fuel vapor storage canister 18 which is, in an automotive application, typically a carbon or charcoal filled canister. The canister 18 is typically connected to a vent tube on a fuel tank 20.

The regulator 10 has an electrical receptacle 22 which has an electrical connector terminal 24 disposed therein and which is adapted for connection to an electronic control unit (ECU) 26 which is typically an engine controller for controlling the electrical fuel injectors on the engine.

The assembly 10 includes a regulator housing 28 which has a generally hollow cylindrical configuration and a partition or first wall 30 formed thereacross and which has a small pressure equalization bleed orifice 32 formed therein.

Housing 28 has associated therewith, and preferably formed integrally therewith, as one piece a body 34 for an electrically operated valve indicated generally at 36. The valve body 34 has an inlet passage 38 which communicates with a chamber 40 formed on the lower side of partition 30 which is designated as an inlet pressure chamber. Inlet passage 38 also communicates with one side of a valve seat 42 formed in valve body 34. A valve member preferably a spherical member 48 is disposed to contact valve seat 42. The side of the valve seat 42 opposite the inlet side communicates with an outlet passage 44 which also communicates with an outlet pressure chamber 46 formed on the side of partition 30 opposite chamber 40.

Valve 36 has a tubular armature guide 50 having the lower end piloted in an annular magnetic flux collector 52 and received centrally within a bobbin 54 which has wound therearound a coil 55 of conductive wire such as magnet wire. Coil 55 has a generally O-shaped pole frame 57 disposed thereabout for completing a flux loop Armature guide 50 has slidably received therein a ferromagnetic armature 56 which is urged downwardly such that its lower end is in contact with valve member 48 by one end of a coil spring 58 which has its upper end registered against an adjustment screw 60 provided in a flux collector or stationary pole piece 62 received in the upper end of the central region of bobbin 54.

Housing 28 has disposed in chamber 46 a pressure responsive flexible diaphragm 64 preferably formed of elastomeric material which is retained and sealed in the housing about its periphery by the closure member 66 which has the lower end of a cylindrical wall portion 68 thereof registered against the periphery of the diaphragm 64 and compressing the periphery against the upper surface of the housing wall 30. The closure 66 has a central hub 70 which forms the outlet fitting 12 and which has a passage 72 therethrough and which forms annular valve seat or port 74 formed in the lower end of fitting 12.

Diaphragm 64 has a moveable valve member or obturator in the form of a plate 76 provided on the upper surface thereof adjacent the port 74; and, the valve member 76 is biased downwardly by the lower end of a spring 78 which has its upper end registered against the undersurface of closure 66. Closure 66 has formed therein a bleed hole 80 which provides communication therethrough with the chamber 46.

An annular retaining member 82 is received over the hub 70 and is secured thereon and sealed thereabout by weldment. The outer periphery of the member 82 has a V-shaped groove formed in the undersurface thereof which is in contact with the upper ends of the cylindrical wall portion 68 of closure member 66 and the upper end of the cylindrical wall of housing 28; and, member 22 is secured thereon and sealed thereabout also by weldment.

The annular retaining member 82 thus forms a second chamber 84 above the closure member 66; and, chamber 84 communicates with chamber 46 only through the small bleed orifice 80.

The inlet chamber 40 has a layer of filter material 86 disposed therein which is in contact about its periphery with an annular shoulder or ledge 88 formed in the lower region of the inner periphery of housing 28 and is retained thereon by a closure member 90 which has the inlet fitting 16 formed therein and which defines an inlet passage 92. Closure member 90 has a cylindrical portion 94 formed about the periphery thereof the upper end of which retains the periphery of filter layer 86 against the shoulder 88. Closure member 90 is retained in the housing 28 by a ring having a V-shaped groove in the upper surface thereof which is disposed over the lower edges of the closure periphery 94 and the housing 28 and is sealed thereabout by weldment.

In operation, with the coil 55 deenergized valve 36 is a normally closed valve by virtue of the force of spring 58 urging armature 56 and valve 48 against the seat 42 thus preventing flow through the passage 44. Upon energization of the coil 55 of electrically operated valve 36 according to a suitable algorithm from an ECU such as 26, the valve member 48 permits flow from canister 18 through passage 92 and chamber 40 to the outlet chamber 46 where pressure is regulated by diaphragm 64 moving valve member 76 against the force of spring 78 to control flow over valve seat 74 through outlet 72 to the engine intake manifold 14.

In the event perturbations or transient pulsations are experienced in either chamber 40 or chamber 46 causing diaphragm 64 to vibrate, the pressure waves are dampened by the restriction of flow through bleed hole 80 and closed chamber 84 which acts as a dampener thereby preventing transient pressure waves in the pressure regulator 12 from causing system resonance and "hooting".

Figure 2:
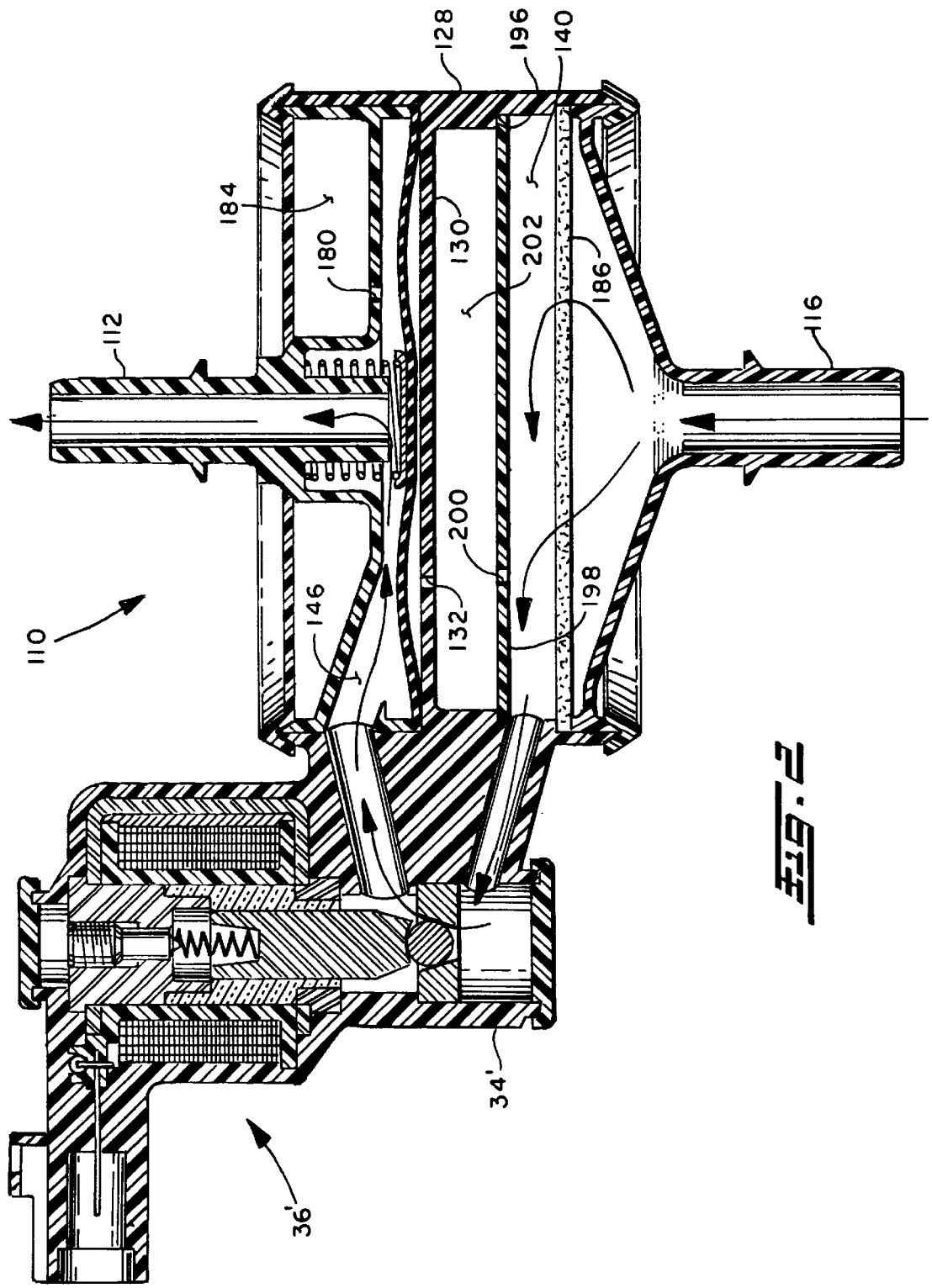

Referring to FIG. 2, an alternate embodiment of the invention is illustrated generally at 112 and includes an electrically operated valve 36' having a body 34' formed integrally with a pressure regulator valve housing 128. It will be understood that valve 36' is otherwise identical in construction and function to the valve 36 of the embodiment of FIG. 1.

The embodiment of FIG. 2 has a dampening chamber 184 provided above the chamber 146 and communicates through a bleed orifice 180 to provide dampening of the diaphragm against spurious transients in the chamber 146 in the same manner as the embodiment of FIG. 1.

Housing 128 is constructed identical to housing 28 of FIG. 1 with the exception that a second annular shoulder or ledge 196 is formed in the interior thereof between the filter layer 186 and the wall 130. The ledge 196 has disposed thereagainst an auxiliary partition 198 which has its periphery secured to ledge 196 preferably by weldment. Partition 198 has a bleed orifice 200 formed therein which permits communication between the inlet chamber 140 and an auxiliary chamber 202 formed between the partition 198 and the wall 130. Thus, the partition 198 forms an auxiliary dampening chamber 202 for dampening pulsations or transient pressure waves which may occur in the inlet chamber 140.

The present invention thus provides a low cost relatively simple to manufacture fuel vapor canister purge valve which has a pressure regulator and an integrally formed electrically operated flow control valve therein. The valve assembly of the present invention includes in one embodiment a pressure wave dampening chamber on the outlet side thereof which communicates with the pressure regulator valve. A second embodiment includes an auxiliary dampening chamber provided on the inlet side of the valve which communicates with the inlet pressure chamber through a bleed orifice formed in an auxiliary partition dividing the inlet chamber.

Although the invention has hereinabove been described with respect to the illustrated embodiments, it will be understood that the invention is capable of modification and variation and is limited only by the following claims.

We claim:

1. An electrically controlled flow regulator valve assembly comprising:
    (a) housing means including a pressure responsive member defining an outlet pressure chamber and an inlet pressure chamber which chambers are disposed on opposite sides of said member and including a valve body associated with said housing means having an inlet passage communicating with said inlet chamber and an outlet passage communicating with said outlet chamber;
    (b) an outlet closure member forming a portion of said outlet chamber and including an outlet port and a regulator valve seat, said outlet closure including a bleed orifice therethrough;
    (c) a wall member forming a dampening chamber with said outlet closure member and sealing said closure member on said housing;
    (d) an inlet closure member defining an inlet port and adapted for connection to a fuel vapor canister, said inlet closure member disposed for closing and sealing said inlet chamber; and,
    (e) a valve member moveably disposed in said body for controlling flow between said valve body inlet passage and outlet passage; and, a solenoid associated with said body for effecting movement of said valve member.

2. The valve assembly defined in claim 1, wherein at least one of said inlet and outlet closure members is sealed to said housing means by weldment.

3. An electrically controlled flow regulator valve assembly comprising:
    (a) housing means having a pressure responsive member disposed therein and forming an inlet pressure chamber on one side of said pressure responsive means and an outlet chamber on a side of said pressure responsive means opposite said one side;
    (b) a valve body associated with said housing means, said body defining an inlet passage communicating with said inlet pressure chamber and an outlet passage communicating with said outlet pressure chamber;
    (c) means defining a first wall closing said outlet pressure chamber and defining an outlet port therein and a restrictive flow orifice;
    (d) means defining a valving surface moveable with said pressure responsive means for controlling flow through said outlet port;
    (e) means defining a second wall forming a closed dampening chamber communicating with said restrictive flow orifice on a side of said first wall opposite said outlet pressure chamber;
    (f) a valve obturator disposed in said valve body and moveable therein for controlling flow between said inlet passage and said outlet passage; and,
    (g) a solenoid operable upon electrical energization to effect said movement of said obturator.

4. The valve assembly defined in claim 3, wherein said means defining a first wall and said means defining a second wall comprise separate members sealed on said housing.

5. The valve assembly defined in claim 3, wherein said means defining a first wall comprises a member having an outlet fitting thereon.

6. The valve assembly defined in claim 3, wherein said means defining said first wall and said means defining said second wall are sealed to said housing means by weldment selected from the group consisting of ultrasonic welding and spin-friction welding.

7. The valve assembly defined in claim 3, wherein said valve body is formed integrally as one-piece with said housing means.

8. A method of making an electrically controlled flow regulator valve assembly comprising:
    (a) forming a housing having a generally hollow cylindrical configuration;
    (b) disposing a resilient pressure responsive diaphragm in said housing and forming an inlet pressure chamber on one side of said diaphragm and an outlet pressure chamber on the opposite side of said diaphragm;
    (c) disposing an electrically operated valve with said housing and porting said valve separately to said inlet and outlet pressure chambers, and electrically controlling flow therebetween;
    (d) Closing said outlet pressure chamber with a first wall member and porting said first wall member to the exterior of said housing and closing said inlet chamber with a second wall and porting said wall to the exterior of said housing; and,
    (e) attaching a third wall member to said housing and forming a dampening chamber with said outlet chamber wall and permitting restricted flow from said outlet pressure chamber to said dampening chamber.

9. The method defined in claim 8, wherein said step of closing said outlet pressure chamber and said step of forming a dampening chamber include sealing a closure member and a separate wall member to said housing by common weldment.

10. The method defined in claim 8, wherein said step of disposing an electrically operated valve with said housing includes forming a valve body integrally as one-piece with said housing.

11. The method defined in claim 8, wherein said step of closing said outlet pressure chamber and said step of attaching said third wall member include welding selected from ultrasonic welding and spin-friction welding.

* * * * *